W. L. DODD & F. E. COMSTOCK.
SEED PLANTER.
APPLICATION FILED NOV. 30, 1908.
916,539.
Patented Mar. 30, 1909.
2 SHEETS—SHEET 1.
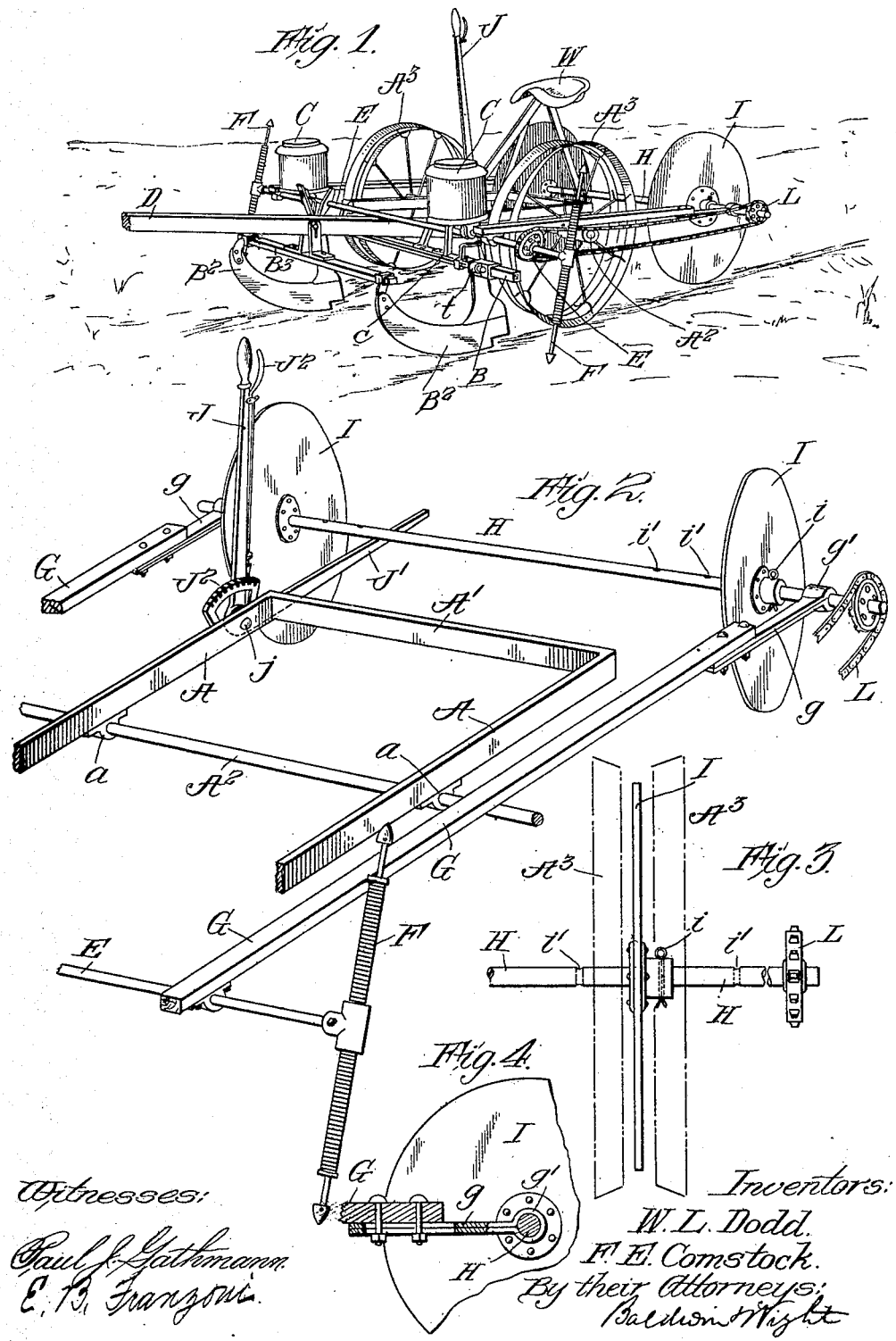

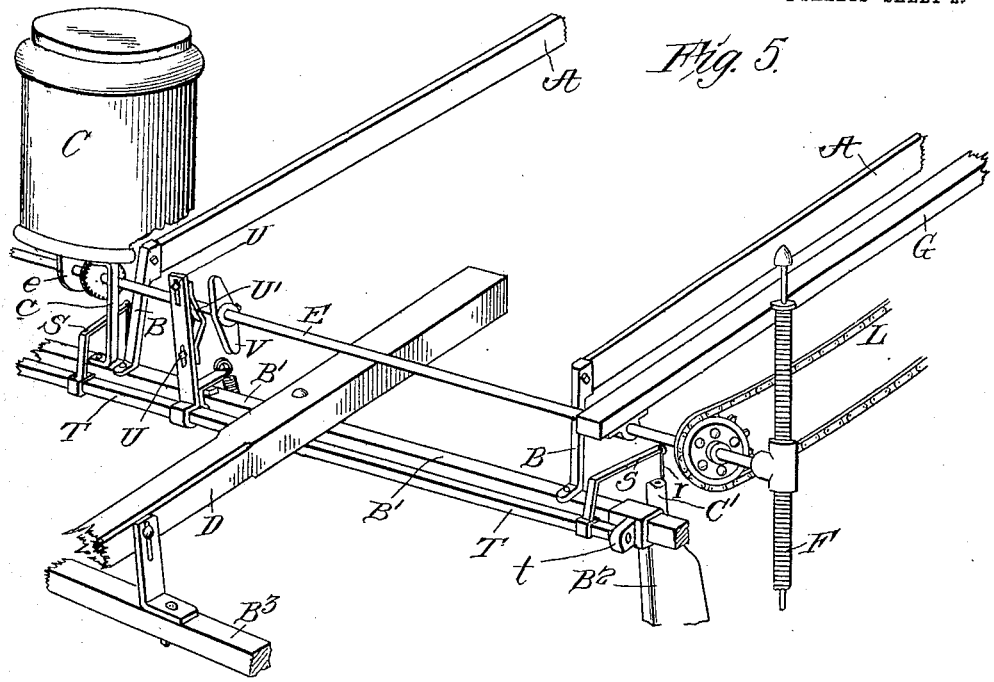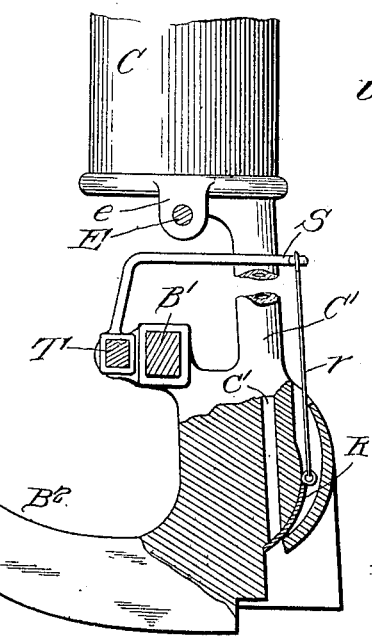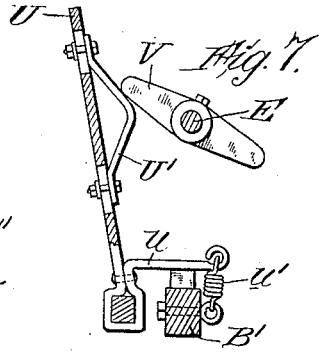

UNITED STATES PATENT OFFICE.

WALTER L. DODD, OF WESTVILLE, AND FREDERICK E. COMSTOCK, OF VALPARAISO, INDIANA.

SEED-PLANTER.

No. 916,539.  Specification of Letters Patent.  Patented March 30, 1909.

Application filed November 30, 1908. Serial No. 465,274.

*To all whom it may concern:*

Be it known that we, WALTER L. DODD, residing in Westville, in the county of Laporte and State of Indiana, and FREDERICK E. COMSTOCK, residing in Valparaiso, in the county of Porter and State of Indiana, both citizens of the United States, have invented certain new and useful Improvements in Seed-Planters, of which the following is a specification.

Our invention relates to seed planters of the kind shown in Letters Patent of the United States No. 765,130 granted to us on July 12, 1904, and the object of our invention is to simplify and improve the mechanism shown and described in said patent.

According to our present invention we provide a main frame which is supported on the main axle and on the frame of the shoes, runners or furrow openers in advance of the carrying wheels. The seed boxes are supported on the runner frame and the seed is fed by a shaft carrying on its outer end markers of the kind shown in the above mentioned patent, such shaft being driven by gearing connecting it with a shaft in rear of the marker shaft which carries disks or wheels adapted to run in the paths of the main carrying wheels. This last mentioned shaft is supported in an auxiliary frame which can be raised and lowered to lift the disks or wheels off the ground or to lower them thereto. The seed tubes, which are connected with the seed boxes, are provided with valves or gates opened and closed by connections with a rock shaft carrying an arm provided with a shoe with which coöperate arms projecting from the marker shaft. The disks or rear wheels are adjustable transversely of the line of draft so that they may be made to run in the tracks of the main carrying wheels or on either side thereof and the bearings of the shaft or axle of these disks may be adjusted to tighten the chain of the sprocket gearing which is preferably employed.

In the accompanying drawings,—Figure 1 is a perspective view of a corn planter constructed in accordance with our invention. Fig. 2 is a perspective view on an enlarged scale showing particularly the manner of mounting the disks which communicate motion to the marker shaft and the devices for raising and lowering these disks. Fig. 3 is a detail view in end elevation showing particularly the manner of adjusting the disks laterally or transversely of the line of draft. Fig. 4 is a detail view showing the manner of adjusting the bearings on the rear shaft or axle which carries the disks in order to tighten the chain of the sprocket gearing. Fig. 5 is a perspective view on an enlarged scale of the front part of the machine showing particularly the devices at the front end of the machine by which motion is communicated to the marker shaft and by which the seed dropping devices are operated. Fig. 6 is a detail view of the seed feeding and seed dropping devices. Fig. 7 is a detail view showing the manner of communicating motion from the marker shaft to the rock shaft which actuates the seed dropping valves or gates.

The main frame is shown as consisting of two frame bars A connected at the rear by a cross bar A' and supported at the front on brackets B rising from the cross bar B' which is connected to the rear ends of the shoes, runners or furrow openers $B^2$. The main axle $A^2$ carries wheels $A^3$ and is supported in bearings $a$ attached to the frame bars A. The seed boxes C are supported on brackets $c$ rising from the cross bar B' and the tongue D is attached to the cross bar B', in the manner shown, and also to a front cross bar $B^3$ which connects the front ends of the shoes $B^2$.

The seed feeding devices may be of any suitable kind and they are operated by a shaft E, which we call the marker shaft as it carries on its outer ends the markers F, which are constructed and operated in the manner described in our patent before mentioned. This shaft is supported in brackets $e$ depending from the seed boxes and to the shaft are hinged the front ends of two parallel frame bars G which carry on their rear ends arms $g$ provided with bearings $g'$ for the rear shaft or axle H. The arms $g$ are adjustably connected with the bars G, in the manner shown in Fig. 4, for a purpose hereinafter described. The seat W may be supported on the main frame in any suitable way.

The shaft H carries two disks or wheels I which are connected with the shaft by means of cotter pins $i$ extending through holes $i'$ in the shaft. By this arrangement the disks may be made to travel directly behind the main wheels $A^3$ in the tracks or paths made thereby or may be made to travel on either side thereof. Other devices for adjusting the disks may, of course, be employed.

The axle H may be raised and lowered so as to lift the wheels or disks I off the ground or to allow them to rest thereon. For this purpose we preferably employ a lever J having suitable detent devices J² and connected with an arm J' extending under the shaft or axle H. By moving the lever forward, the axle with the frame bars G may be raised. By moving it rearward, the axle with the frame bars and disks may be lowered.

The marker shaft E is connected with the shaft H by means of sprocket gearing L. By changing the sprocket wheels, that is by using wheels of different sizes the rate of feed of the seed and the distance between the hills may be varied.

As in our prior patent, the seed is fed through tubes C' to channels c' in the lower rear portions of the shoes B². These channels are closed by gates or valves R connected by rods r to arms S extending rearwardly from a rock shaft T mounted in bearings t attached to the frame bar B'. This rock shaft carries an arm U provided with an adjustable shoe U' coöperating with arms V projecting from the marker shaft E. The arm U is provided with an extension u to which is attached a spring u' which normally draws the shoe U' toward the shaft E and into engagement with the arms V. As the marker shaft is rotated, the arms V act upon the shoe U' and the rock shaft T, thus opening and closing the gates or valves R and dropping the seed at the proper intervals. It will be observed that the shoe U' is inclined both upwardly and downwardly so that the marker shaft may rotate in either direction without jamming any of the mechanism. By means of the devices shown in Fig. 4, the tension of the chain L may be conveniently regulated.

While our planter is especially designed for dropping corn it may be used for planting other seed.

We claim as our invention:—

1. A seed planter, comprising a main frame, seed boxes, a marker shaft connected with the seed feeding devices, main carrying wheels supporting the main frame, a rear shaft or axle carrying disks or wheels arranged to travel behind the main carrying wheels, means for raising and lowering these wheels, gearing connecting the rear shaft or axle with the marker shaft, seed dropping devices, and means actuated by the marker shaft for operating the seed dropping devices.

2. The combination of a main frame, the main axle and wheels by which it is supported, runners in advance of the main carrying wheels, a runner frame, seed boxes supported on the runner frame, a marker shaft gearing with the seed feeding devices, a shaft or axle in rear of the main axle, wheels or disks mounted thereon and adjustable transversely on the rear axle to the line of draft, a frame in which the rear axle is supported, means for raising and lowering this frame, gearing connecting said rear axle with the marker shaft, and seed dropping devices actuated from the marker shaft.

3. The combination of the main frame, its main axle and carrying wheels, an auxiliary frame, a rear shaft or axle mounted therein, disks or wheels mounted on this shaft, a marker shaft, gearing connecting the marker shaft with the rear shaft or axle, gearing connecting the marker shaft with the seed feeding devices, an arm projecting laterally from the marker shaft, a shoe inclined in opposite directions coöperating with said arm, a rock shaft with which said shoe is connected, and connections between this rock shaft and the seed dropping devices.

In testimony whereof, we have hereunto subscribed our names.

WALTER L. DODD.
FREDERICK E. COMSTOCK.

Witnesses:
S. G. HAUS,
EMERSON VANDUSEN.